(12) United States Patent
Schaefer

(10) Patent No.: US 11,816,339 B2
(45) Date of Patent: Nov. 14, 2023

(54) SELECTABLE ERROR CONTROL FOR MEMORY DEVICE

(71) Applicant: Micron Technology, Inc., Boise, ID (US)

(72) Inventor: Scott E. Schaefer, Boise, ID (US)

(73) Assignee: Micron Technology, Inc., Boise, ID (US)

(*) Notice: Subject to any disclaimer, the term of this patent is extended or adjusted under 35 U.S.C. 154(b) by 258 days.

(21) Appl. No.: 17/391,898

(22) Filed: Aug. 2, 2021

(65) Prior Publication Data

US 2022/0075532 A1 Mar. 10, 2022

Related U.S. Application Data

(60) Provisional application No. 63/075,290, filed on Sep. 7, 2020.

(51) Int. Cl.
*G06F 3/06* (2006.01)

(52) U.S. Cl.
CPC .......... *G06F 3/0619* (2013.01); *G06F 3/0655* (2013.01); *G06F 3/0679* (2013.01)

(58) Field of Classification Search
CPC .... G06F 3/0619; G06F 3/0655; G06F 3/0679; G06F 11/1048
See application file for complete search history.

(56) References Cited

U.S. PATENT DOCUMENTS

2010/0125750 A1* 5/2010 Moyer ................ G06F 11/0793
714/E11.071

* cited by examiner

*Primary Examiner* — April Y Blair
*Assistant Examiner* — Rong Tang
(74) *Attorney, Agent, or Firm* — Holland & Hart LLP

(57) ABSTRACT

Methods, systems, and devices for selectable error control for memory device are described. An apparatus may include a memory array and a circuit configurable to perform a first error control operation and a second error control operation on data stored by the memory array. The circuit may include a first plurality of gates enabled during the first error control operation and configured to generate a first set of bits associated with a first matrix of the first error control operation. The circuit may also include a second plurality of gates enabled during the second error control operation and configured to generate a second set of bits associated with the second matrix of the second error control operation. The circuit may further include a third plurality of gates configured to generate a third set of bits that are common to both the first matrix and the second matrix.

35 Claims, 5 Drawing Sheets

SELECTABLE ERROR CONTROL FOR MEMORY DEVICE

CROSS REFERENCE

The present application for patent claims the benefit of U.S. Provisional Patent Application No. 63/075,290 by SCHAEFER et al., entitled "SELECTABLE ERROR CONTROL FOR MEMORY DEVICE," filed Sep. 7, 2020, which is assigned to the assignee hereof, and which is expressly incorporated by reference herein.

FIELD OF TECHNOLOGY

The following relates generally to one or more systems for memory and more specifically to selectable error control for memory device.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
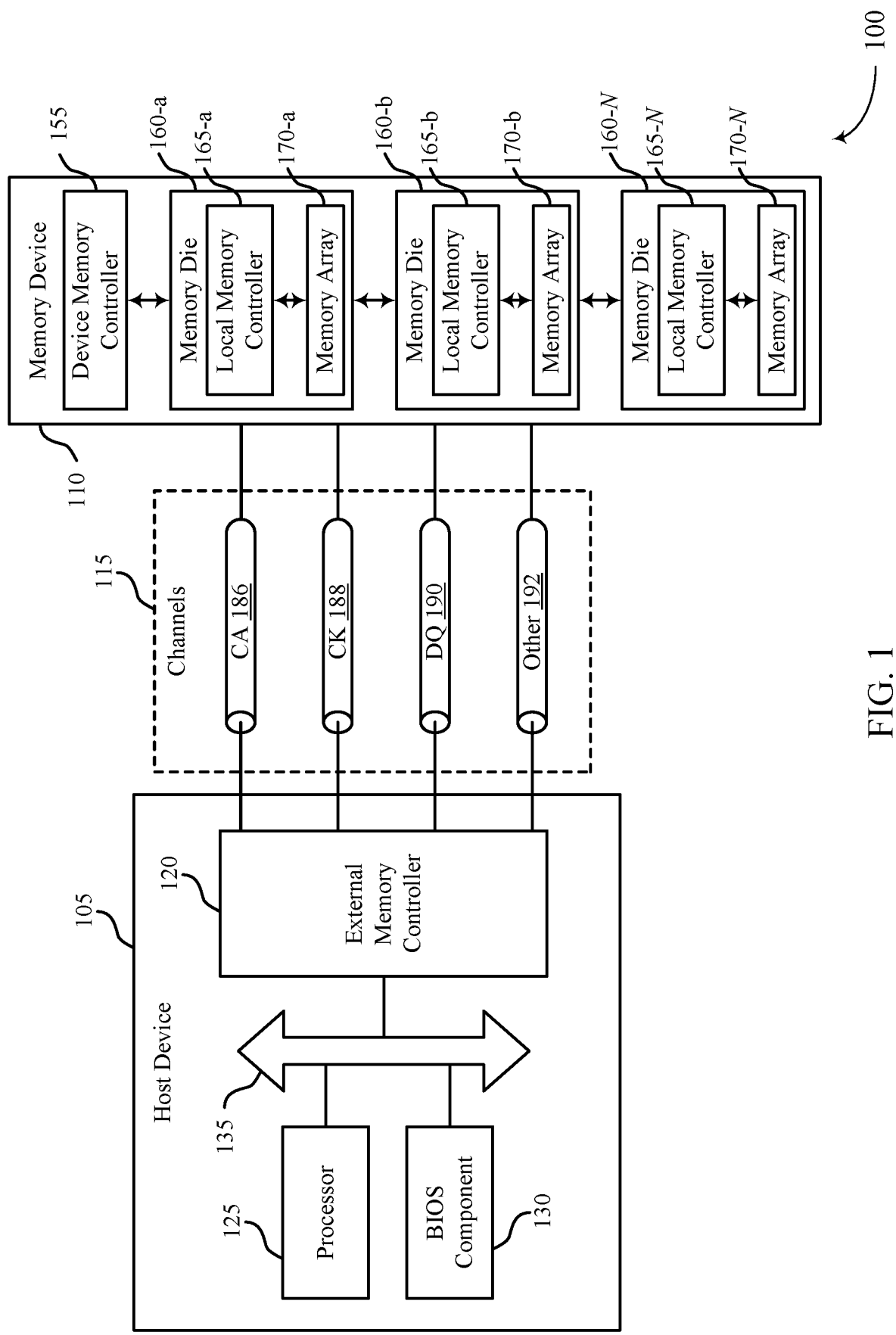
FIG. 1 illustrates an example of a system that supports selectable error control for memory device in accordance with examples as disclosed herein.

A memory device store for information for use by a host device. In some examples, the memory device may perform an error control operation (e.g., apply an error correction code (ECC)) to verify either the communication of data between the host device and memory device (e.g., link ECC) or verify that the data stored by the memory device is correct (e.g., on-die ECC). There may be a plurality of error control operations that the memory device may utilize. For example, the memory device may implement a single error correction (SEC) operation or may implement a single bit correction and detect double bit detection (e.g., SECDED) operation. In other examples, the memory device may utilize an aliasing scheme to indicate where double bit errors occurred. The memory device may also detect or correct multi-bit errors (e.g., triple bit errors). In some examples, the memory device may generate parity bits in the error control operation. For example, the memory device may generate a first set of parity bits when the data is written to the memory device and generate a second set of parity bits when the data is read from the memory device. In such examples, the memory device may compare the first set of parity bits with the second set of parity bits to detect errors associated with the data or correct errors associated with the data or both.

Additionally, the memory device may utilize a parity check matrix (e.g., an H-matrix) to generate the parity bits. The H-matrix may be combined with data bits to generate a parity bit for a given set of data bits. The circuitry to implement an error control operation may be based on a configuration of the H-matrix. That is, the error control operation may be performed by an error control circuit that includes a plurality of gates. The configuration of the gates or other circuit components may be based on the configuration of the H-matrix. In some examples, the memory device may generate a relatively high quantity of parity bits to improve the diagnostic results of an error control operation—e.g., the increased quantity of parity bits may improve the memory device's ability to detect and correct errors. In such examples, the memory device may utilize additional circuitry and gates causing additional power consumption and delays. In other examples, the memory device may generate a relatively low quantity of parity bits to increase the overall speed of the memory device and reduce power consumption. In such examples, the memory device may be unable to detect and correct all the errors associated with the data. Thus, performance tradeoffs may exist between robust error control operations and speed and power consumption considerations. Additionally or alternatively, each H-matrix may be associated with different logical components and multiple H-matrices may take additional space in the memory device.

Systems, techniques, and devices are described herein for a memory device that includes an error control circuit that may select between two or more different error control operations that share common circuitry. That is, each error control operation may be associated with an H-matrix and each H-matrix may be broken into subcomponents and converted to logic such that at least a portion of the subcomponents are common to each H-matrix. For example, a host device may indicate which error control operation the memory device is to use on data. When selecting a first error control operation associated with a first H-matrix, the memory device may use a first plurality of gates in the error control circuit to generate a first error code. When selecting a second error control operation associated with a second H-matrix, the memory device may use a second plurality of gates in the error control circuit to generate a second error code. Additionally or alternatively, to avoid power consumption, space in the memory device, and consuming additional resources, the error control circuit may also include a third plurality of gates that are common to the first error control operation and the second error control operation and used for both error control operations. That is, by having each H-matrix share common subcomponents, the memory device may refrain from utilizing extra space that may occur when each H-matrix is supported independently. Further, the memory device may disable the second plurality of gates during the first error control operation and disable the first plurality of gates during the second error control operation to reduce power consumption. By including circuitry that share some components to select between two or more different error control operations, the memory device may allow the host device to select an error control operation based on the host device's operating parameters and settings while reducing power consumption and space utilized in the memory device for the error control circuit.

Features of the disclosure are initially described in the context of a system and dies as described with reference to FIG. 1. Features of the disclosure are described in the context systems and error control circuits as described with reference to FIGS. 2 and 3. These and other features of the disclosure are further illustrated by and described with reference to an apparatus diagram and a flowchart that relate to selectable error control for memory device as described with reference to FIGS. 4 and 5.

FIG. 1 illustrates an example of a system 100 that supports selectable error control for memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or interface with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any number of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

In some examples, the one or more other channels 192 may include one or more error detection code (EDC) channels. The EDC channels may be operable to communicate error detection signals, such as checksums, to improve system reliability. An EDC channel may include any quantity of signal paths.

In some examples, the memory device 110 may perform an error control operation. For example, memory device 110 may perform an error control operation when transmitting data between the memory device 110 and host device 105 over the channels 115 or while reading data from or writing data to the memory array 170. The memory device 110 may detect and/or correct single bit, double bit, or multi-bit errors while performing the error control operation. In some examples, the correction and detection may be based on the robustness of an error control circuit in the memory device 110. A more robust error control operation may increase diagnostic coverage but also increase latency, power consumption, and utilize additional space in the memory device 110. Other error control circuits may decrease the diagnostic coverage but may reduce latency and power consumption.

As described herein, the memory device 110 may include an error control circuit that may select between two or more different error control operations with overlapping circuitry. In such examples, the host device 105 may select an error control operation to utilize. The memory device 110 may enable the error control circuitry associated with the error control operation selected by the host device 105 and disable the remaining circuitry. By having components that overlap between the first and second error control operations, the memory device 110 may have multiple available error control operations to select from while conserving space and power in the memory device 110.

Figure 2:
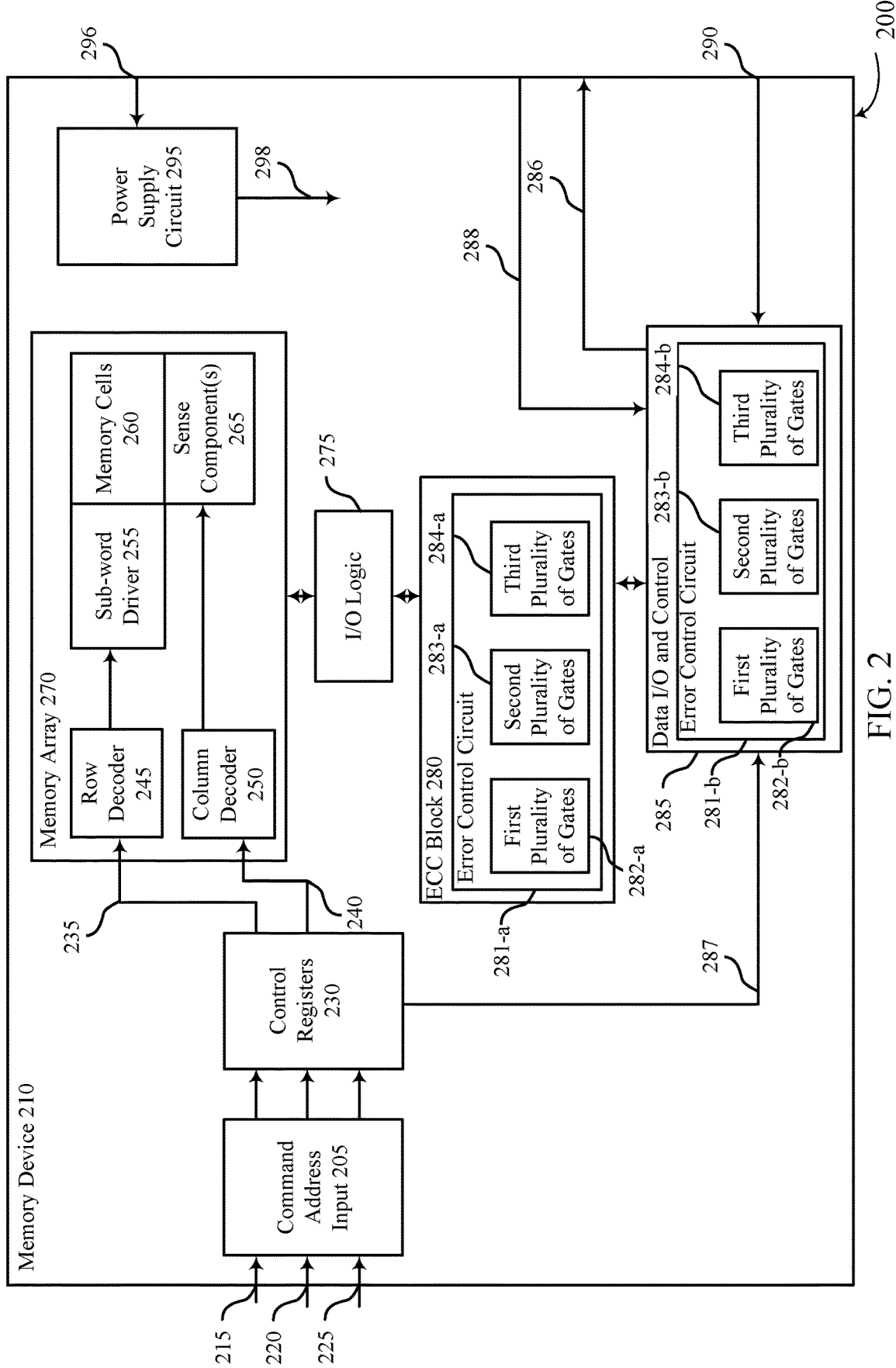
FIG. 2 illustrates an example of a system that supports selectable error control for memory device in accordance with examples as disclosed herein.

FIG. 2 illustrates an example of a system 200 that supports selectable error control for memory device in accordance with examples as disclosed herein. Memory device 210 may be an example of memory device 110, as described with reference to FIG. 1. The memory device may include a command address input 205, control registers 230, a memory array 270, I/O logic 275, ECC block 280, data I/O control 285, and a power supply circuit 295. The memory array 270 may be an example of the memory array 170 as described with reference to FIG. 1. The memory array 270 may include a row decoder 245, a column decoder 250, a sub-word driver 255, memory cells 260, and a sense component 265. Each ECC block 280 and data I/O and control 285 may include an error control circuit 281 and a first plurality of gates 282, a second plurality of gates 283, and a third plurality of gates 284.

Command address input 205 may be configured to receive input 215. The input 215 may be a clock signal (e.g., a ck_k or ck_c signal) communicated over a clock signal channel (e.g., a clock signal channel 188 as described with reference to FIG. 1). The clock signal input 215 may provide a timing reference for command and addressing operations performed by the memory device 210. In some examples, the command address input 205 may be configured to receive input 220. The input 220 may be a reset signal communicated over a channel and that may be configured to provide a hardware reset for the memory. In some examples, the signal may provide a reset on the clock signals received at input 215. This may align the clocks high and low states as described with reference to FIG. 1. The command address input 205 may also receive a command/address (CA) input 225. The CA input 225 may be communicated over a CA channel (e.g., CA channel 186 as described with reference to FIG. 1). The CA input 225 may include control information associated with a received command from a host device (e.g., a host device 105 as described with reference to FIG. 1), such as a code (e.g., opcode) for the command to be performed or address information for a memory address associated with the command or both. The command address input 205 may also include buffers to receive the various inputs 215, 220, and 225. The command address input 205 may send the received signals to the control registers 230. Other inputs for command signaling may include a chip enable signal.

The control registers 230 may be configured to receive control information from the command address input 205. In some examples, the control registers 230 may include a plurality of registers configured to store control information (e.g., address information) and send the control information to the memory array 270 or other components of the memory device 210. For example, the control registers 230 may be configured to identify a row address 235 and a column address 240 from the CA signal received from the command address input 205. The control registers 230 may also include a mode register. The mode register may be configured to store a value that is associated with an error control operation (e.g., depending on the value stored in the mode register the memory device may apply a different error control operation). In some examples, the control registers 230 may be configured to store various logical information associated with operations of the memory device 210—e.g., the control registers 230 may store logical information associated with a test mode of the memory device 210.

The memory array 270 may be configured to read data out to the host device or have data from the host device written to the memory cells 260. Accessing the memory cells may be controlled through a row decoder 245 or a column decoder 250. The row decoder 245 may be configured to receive a row address 235 from the control registers 230 and activate a word line in the memory array 270 based on the received row address 235. In some examples, the sub-word driver 255 may be configured to drive a voltage to activate a given word line based on the information received from the row decoder 245. The column decoder 250 may be configured to receive a column address 240 from the control registers 230 and activate a digit line in the memory array 270 based on the received column address. In some examples, the sense components 265 may be configured to drive a voltage to activate a given digit line based on the information received from the column decoder 250. The memory cells 260 may be configured to store data received from the host device. In some examples, the memory cells may also be configured to be accessed during an access operation (e.g., a read, write, or refresh operation). The sense component 265 may be configured to detect a state (e.g., a charge) stored on the at a memory cell of the memory cells 260 and determine a logic state of the memory cell based on the stored state. The sense component 265 may include one or more sense amplifiers to amplify or otherwise convert a signal resulting from accessing the memory cell. The detected logic state of the memory cell may be provided as an output of the sense component 265 (e.g., to an I/O logic 275), and may indicate the detected logic state to another component of a memory device that includes the memory array 270.

The I/O (input/output) logic 275 may be configured to input information to or output information to or from the memory array 270 to other components of the memory device 210. For example, the I/O logic 275 may receive data from the memory array 270 and send it to the ECC block 280. In other examples, the I/O 275 logic may receive information from the ECC block 280 and send the information to the memory array 270. That is, the I/O logic 275 may provide a path for data to flow in the memory device 210.

ECC block 280 may be configured to receive data from either the I/O logic 275 and the memory array 270 or from the data I/O and control 285 and the host device. In some examples, the ECC block 280 may be configured to perform an error control operation when data is read from or written to the memory array 270. For example, the ECC block 280 may be configured to generate a first set of parity bits when data is written to the memory array 270. In some cases, the ECC block 280 may then be configured to generate a second set of parity bits when data is read from the memory array 270 and compare or combine the first set of parity bits with the second set of parity bits to detect and/or correct errors associated with reading data from and writing data to the memory array 270. The ECC block 280 may include an error control circuit 281-a. The error control circuit 281-a may be configured to select between two or more error control operations. The error control circuit 281-a may include a first plurality of gates 282-a, a second plurality of gates 283-a, and a third plurality of gates 284-a. The first plurality of gates 282-a may be configured to be activated when performing a first error control operation. For example, the gates 282-a may generate a first set of bits associated with the first error control operation using a first parity check matrix (e.g., an H-matrix when activated. In some examples, the first parity check matrix may indicate which gates of the first plurality of gates 282-a to activate. The second plurality of gates 283-a may be configured to be activated when performing a second error control operation. For example, the gates 283-a may generate a second set of bits associated with the second error control operation and a second parity check matrix when activated. In some examples, the second parity check matrix may indicate which gates of the second plurality of gates 283-a to activate. The third plurality of gates 284-a may be activated during both error control operations. For example, the third plurality of gates 284-a may generate a third set of bits that are common to both the first error control operation and the second control operation.

Data I/O and control 285 may be configured to receive data from or send data to the host device. For example, the data I/O control 285 may receive data or control information from DQ pins 290. The DQ pins 290 may be configured to receive the data or control information from data channels (e.g., DQ channels 190 as described with reference to FIG. 1). In some examples, the data I/O and control 285 may also be configured to output data to the host device via the pins 286. In other examples, the data I/O and control 285 may also be configured to receive I/O control information 287 from the control registers 230 that indicates where to send the data to. The data I/O and control 285 may be configured to receive a clock signal 288 (e.g., a WCK signal). In some examples, the clock signal 288 may indicate a write clock cycle to and from the DQ pins 290. The clock signal 288 may be received over a clock signal channel. Additionally or alternatively, the data I/O and control 285 may be configured to perform an error control operation on the data received from or sent to the host device. The data I/O and control 285 may include an error control circuit 281-b. The error control circuit 281-b may be configured to select between two or more error control operations. The first plurality of gates 282-b may be associated with a first error control operation, the second plurality of gates 283-b may be associated with a second error control operation, and the third plurality of gates 284-b be associated with both the first and second error control operation as described with reference to the error control circuit 281-a.

The power supply circuit 295 may be configured to supply voltages to the various components of the memory device 210. In some examples, the power supply circuit 295 may be configured to receive one or more voltages 296 from a voltage source. The power supply circuit 295 may then generate one or more addition voltages 298 to supply to a given components of the memory device 210.

In some examples, the memory device 210 may perform an error control operation. For example, the memory device 210 may perform an error control operation when receiving data from or sending data to the host device (e.g., link ECC). In other examples, the memory device 210 may perform an error control operation when writing data to or reading data from the memory array 270 (e.g., on-die ECC). Performing the error control operation may enable the memory device 210 to detect or correct errors associated with the data transmission or storage. For example, the memory device 210 may correct single errors and detect double bit errors (e.g. SECDED). In other examples, the memory device 210 may detect or correct multi-bit errors (e.g., triple bit errors). In some cases, the memory device 210 may perform a robust error control operation that utilizes a relatively high quantity of gates. In other examples, the memory device may perform an error control operation that reduces power consumption and delays. Performance tradeoffs may exist between the two approaches.

As described herein, the memory device 210 may include error control circuits 281 that may select between two or more different error control operations that share common circuitry. For example, a host device may indicate which error control operation the memory device is to use on data based on the operating parameters of the host device. In such examples, the host device may write a value to the mode register of the control registers 230 that indicates which error control operation to select. Alternatively, the memory device 210 may select an error control operation based on an internal setting or parameter. When the value read from the mode register by the memory device 210 indicates the first error control operation, the memory device 210 may enable the first plurality of gates 282-a and the third plurality of gates 284-a while deactivating the second plurality of gates 283-a. When the value read from the mode register by the memory device indicates the second error control operation, the memory device 210 may enable the second plurality of gates 283-a and the third plurality of gates 284-a while deactivating the first plurality of gates 282-a. That is, the third plurality of gates 284-a may generate a set of bits that is common to both the first error control operation and the second error control operation. Such a configuration may enable a host device to select an error control operation while also saving space in the memory device 210 and avoiding power consumption. Similarly, the memory device 210 may also select either the first error control operation or the second error control operation when identifying errors with the communication of data between the host device at the data I/O and control 285.

Figure 3:
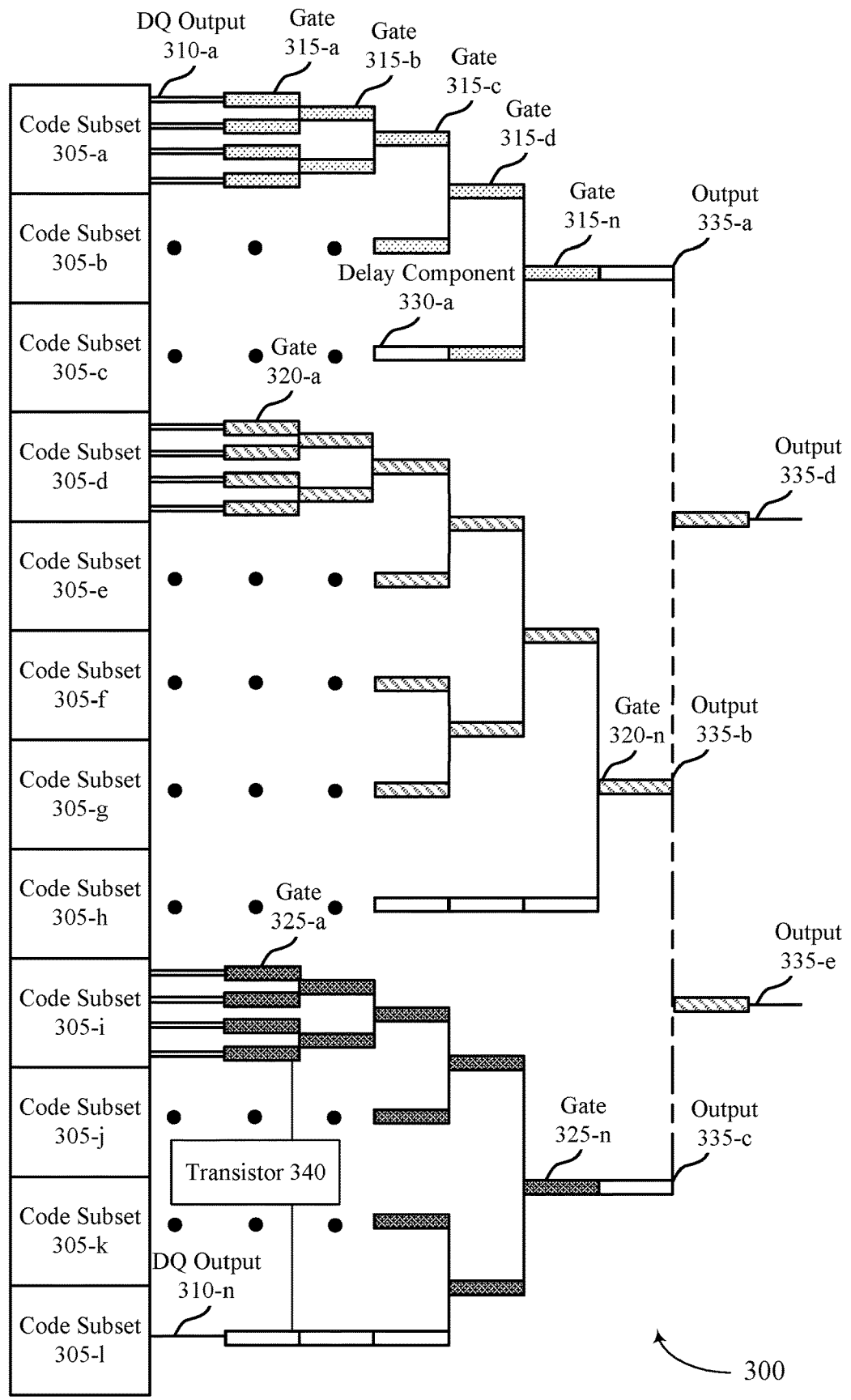
FIG. 3 illustrates an example of an error control circuit that supports selectable error control for memory device in accordance with examples as disclosed herein.

FIG. 3 illustrates an example of an error control circuit 300 that supports selectable error control for memory device in accordance with examples as disclosed herein. Error control circuit 300 may be an example of error control circuit 281-*a* or 281-*b* as described with reference to FIG. 2. The error control circuit 300 may be in a memory device (e.g., a memory device 210 as described with reference to FIG. 2). The error control circuit 300 may include DQ signal paths 310, gates 315, gates 320, gates 325, and optional delay components 330. The gates 315 may be examples of the first plurality of gates 282 as described with reference to FIG. 2. The gates 320 may be examples of the third plurality of gates 284 as described with reference to FIG. 2. The gates 325 may be examples of the second plurality of gates 283 as described with reference to FIG. 2. The gates 315, 320, and 325 may be logic gates—e.g., an exclusive or (XOR) gate—comparators, or other components that compare information and generate an output. In some examples, a quantity of gates in the set of gates 315 may be less than a quantity of gates in a set of gates 325. The error control circuit 300 may be included in an ECC block (e.g., ECC block 280 as described with reference to FIG. 2) or in a data I/O and control (e.g., data I/O and control 285 as described with reference to FIG. 2). The error control circuit 300 may generate parity bits by implementing a parity check matrix as described with reference to FIG. 2.

In some examples, a memory device may perform an error control operation when reading data from or writing data to a memory array (e.g., memory array 270 as described with reference to FIG. 2) or when communicating data between the memory device and a host device (e.g., host device 105 as described with reference to FIG. 1). The error control circuit 300 may include a plurality of gates associated with one or more error control operations the memory device may select from. In some examples, when a memory device initializes, the memory device may select either a first error control operation or a second error control operation based on a stored default value. For example, a mode register (e.g., mode register as described with reference to FIG. 2) may store a default value 0 when the memory device is initialized. In such examples, the memory device may select the first error control operation and activate the gates 315 and 320. In other examples, when selecting the second error control operation, the memory device may activate gates 320 and 325. In other cases, the memory device may initialize without selecting an error control operation.

Additionally, the memory device may deactivate the gates that are unused during a given error control operation—e.g., the gates 325 may be deactivated when the first error control operation is selected and the gates 315 may be deactivated when the second error control operation is selected. For example, during the first error control operation, the gates 325 may be deactivated by a control logic (e.g., a transistor 340 or a switch). That is, the transistor 340 may power off the gates 325. In other examples, the control logic may be an example of a component other than a transistor 340 that powers off or deactivates the gates 325. It should be noted that the location of transistor 340 is just one example and it is not limiting. That is, the transistor 340 may be located elsewhere in the error control circuit 300. In other examples, the gates 325 may be deactivated by selecting specific values for each gate 325 to drive the output 335-*c* to a specific value that effectively renders the gates 325 as inactive. For example, the gates 325 may be driven to output a value one (1) or zero (0) depending on the desired outcome. Similarly, the error control circuit 300 may utilize a switch or transistor to deactivate gates 315 during the second error control operation. Alternatively, the error control circuit 300 may drive the output 335-*a* to a specific value that effectively renders the gates 315 as inactive. In some examples, the memory device may prefer to deactivate the gates with a transistor or switch to reduce power consumption in the memory device. While the transistor 340 is illustrated for gates 325, transistors may be implemented for gates 315 or gates 320. Additionally or alternatively, the functions of the transistor 340 may be performed by any quantity of transistors or other supporting circuitry.

In some examples, the host device may select an error control operation for the memory device. For example, the host device may write a value to the mode register that indicates which error control operation to select. For example, the host may write a value zero (0) when selecting the first error control operation and a value one (1) when selecting a second error control operation. The memory device may be configured to read the value from the mode register and select an error control operation based on the value identified.

After selecting an error control operation, the memory device may generate parity bits by utilizing the error control circuit 300 during an error control operation. For example, during the first error control operation, the gates 315 may generate a first set of bits associated with the first error control operation. In other examples, during a second error control operation, the gates 325 may generate a second set of bits associated with the second error control operation. The error control circuit 300 may use the gates 320 to generate a third set of bits that are common to the first and second error control operation. The memory device may activate gates 315, 320, or 325 based on a parity check matrix (e.g., H-matrix) associated with each error control operation. For example, the memory device may activate gate 315-*a* during the first error control operation based on a first parity check matrix associated with the first error control operation.

In some examples, FIG. 3 may illustrate a configuration while generating a specific parity bit. The error control circuit 300 may be associated with a code subset 305-*a* through 305-*l* when generating the parity bit. Each code subset 305 is associated with a DQ signal path 310. That is, the error control circuit 300 may receive a set of bits from DQ pins (e.g., DQ pins 290 as described with reference to FIG. 2). For example, when there are eight (8) DQ pins, the code subset 305-*a* may be associated with eight (8) bits of data. The eight (8) bits of data may depend on a given clock cycle or an H-matrix associated with the error control operation. For example, during a second error control operation, code subset 305-*l* may include a single DQ signal path 310-*n* based on a second parity check matrix associated with the second error control operation. Whether a given DQ signal path 310 (or DQ pin) is utilized is based on the H-matrix associated with the error control operation being performed.

During a first clock cycle, when implementing the first error control operation, the memory device may compare the set of bits from the DQ pins with each other using the gates 315. For example, gate 315-*a* may compare a bit from a DQ pin zero (0) with a bit from a DQ pin one (1). Gate 315-*a* may generate a comparison bit as a result of the comparison between DQ0 and DQ1. A similar process may be implemented for the remaining bits in the set of bits—e.g., a bit from DQ2 may be compared with a bit from DQ3, etc. In some examples, the comparison bits may then be compared again during a next clock cycle—e.g., the output from gate 315-*a* may be compared with the output of the DQ2 and DQ3 comparison for code subset 305-*a* at gate 315-*b*. This process may continue until the code subset 305-*a* is compressed into a single bit at gate 315-*c*. The error control circuit 300 may also perform a similar operation at the remaining code subsets—e.g., during the first error control operation, code subsets 305-*a* through 305-*h* may be compressed into single bits and during a second error control operation, code subsets 305-*d* through 305-*l* may be compressed into single bits.

In some examples, during a third clock cycle, the error control circuit 300 may compare the output of one code subset 305 with another code subset 305. For example, during the first error control operation, the output of the code subset 305-*a* may be compared with the output of the code subset 305-*b* at gate 315-*d*. In some examples, there may be an odd quantity of code subsets or bits to compare for a given plurality of gates—e.g., there are three (3) code subsets 305 for the gates 315. In such examples, the error control circuit 300 may implement delay components 330 until a given bit is ready to be compared. For example, the output of code subset 305-*c* may be delayed by delay component 330-*a* while the outputs of code subsets 305-*a* and 305-*b* are being compared. Thus, the output of gate 315-*d* (e.g., the comparison results of code subset 305-*a* and 305-*b*) may be compared with the output of code subset 305-*c* at gate 315-*n* to generate output 335-*a*. Gates 320 may implement a similar process—e.g., the outputs of code subsets 305-*d* through 305-*h* are compared until a single bit remains, output 335-*b*.

During a final clock cycle of the first error control operation—e.g., an eighth clock cycle as shown in FIG. 3—the output 335-*a* may be compared with the output 335-*b* to generate the output 335-*d*. The output 335-*d* may be a parity bit of a set of parity bits associated with the first error control operation. Alternatively, when performing the second error control operation, the error control circuit 300 may follow a similar process and compare the output 335-*b* with output 335-*c* to generate the output 335-*e*. The output 335-*e* may be a parity bit of a set of parity bits associated with the second error control operation. In either example, the gates 320 are active. That is, the gates 320 generate comparison bits at are common to both the first error control operation and the second error control operation.

In some examples, the error control circuit 300 may implement a process as described above until eight (8) parity bits are generated (e.g., first parity bits). In other examples, the error control circuit 300 may generate more than eight (8) parity bits or less than eight (8) parity bits based on the error control operation and H-matrix selected. In examples where the error control operation is associated with writing data to a memory array (e.g., memory array 270 as described with reference to FIG. 2), the memory device may store the eight (8) parity bits in a column of the memory array. In examples where the error control operation is associated with receiving data from the host device, the memory device may store the eight (8) parity bits in the data I/O and control.

In some examples, the memory device may receive a read command from the host device. The memory device may output the data written to the memory array based on receiving the read command. While outputting the read data, the memory device may perform the error control operation again. That is, if the first error control operation was utilized when writing data to the array, the first error control operation may be used again while outputting data from the array. The error control circuit 300 may utilize the same process to generate a second set of parity bits associated with outputting the data—e.g., activate gates 315 and 320, compare the DQ bits with one another, and then compress the code subset 305 to a single bit to generate the output 335-*a*. The memory device may then compare the first parity bits with the second parity bits to determine if an error occurred. That is, if the first parity bits are different than the second parity bits, the memory device may detect an error. In some examples, the memory device may correct the error by inverting a bit in the data where the error occurred. In other examples, the memory device may detect the error and indicate the error occurred while transmitting the data to the host device. In some examples, the error detected may be a single bit error, a double bit error, or a triple bit error. Alternatively, the memory device may utilize a similar process when communicating the data to the host device—e.g., link ECC at the data I/O and control.

By implementing two error control operations that have overlapping circuitry, the memory device may enable a host device to select an error control operation while reducing the space taken by the additional error control operation circuitry and avoiding power consumption.

The memory device may enable the use of the first error control operation or the second error control operation in various ways. In some examples, the memory device may be initialized to implement to use the first error control operation or the second error control operation when memory device is initialized. In such examples, the mode register may be set once (e.g., through a fuse or anti-fuse) and the memory device may implement that error control message throughout its life. In some examples, the host device may set the mode register to a value during the initialization utilizing a one-time fuse or program. In some examples, the memory device may be configured to dynamically implement the first error control operation or the second error control operation. In such examples, the host device may be configured to select which error control operation is to be implemented and may set the mode register accordingly. The memory device may periodically check the mode register and may adjust the error control circuit based on the value of the mode register. Additionally or alternatively, the memory device may be configured to implement the error control operation selected by the host for link ECC (e.g., the error control operation at the data I/O and control).

Figure 4:
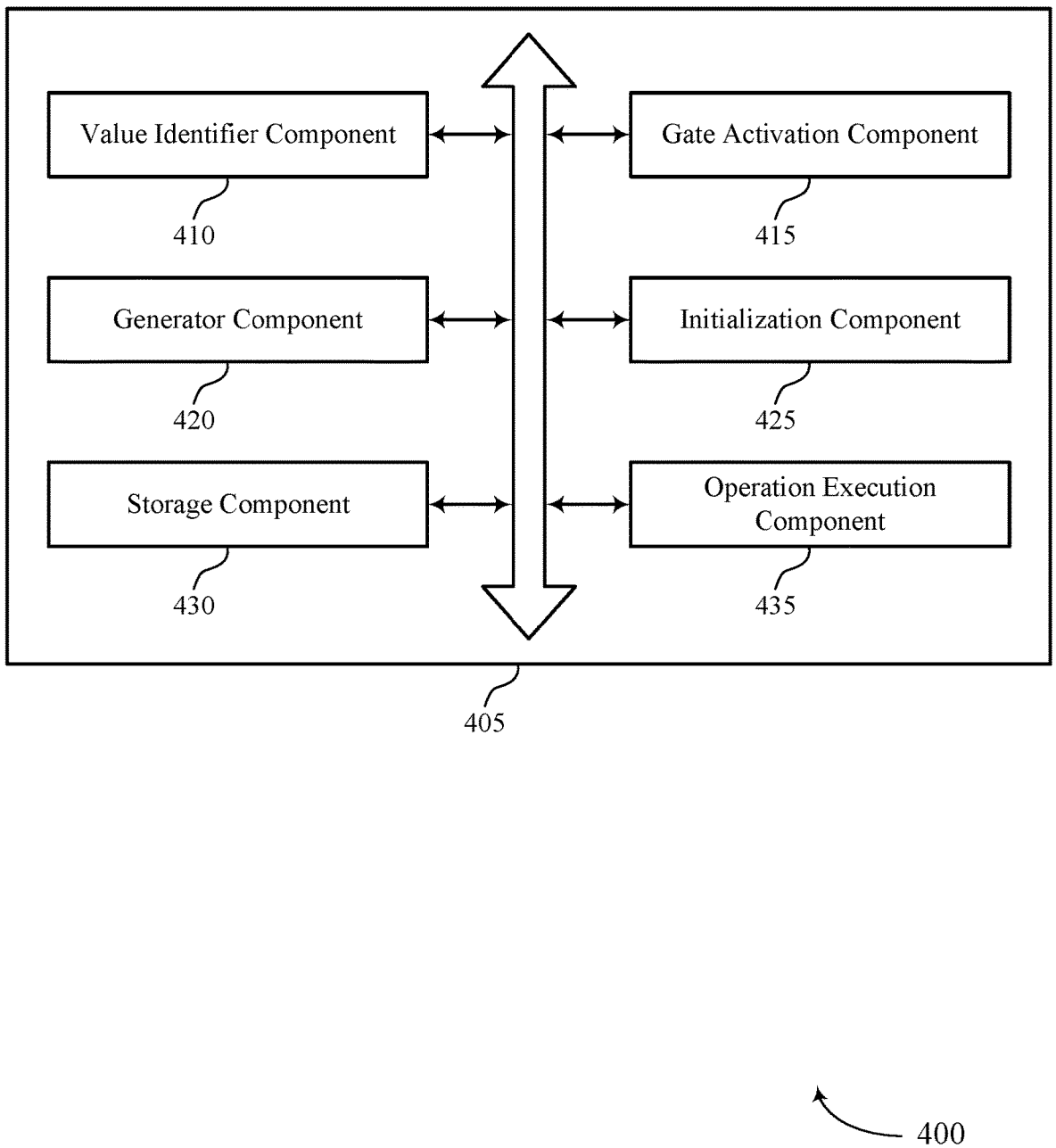
FIG. 4 shows a block diagram of a memory device that supports selectable error control for memory device in accordance with examples as disclosed herein.

FIG. 4 shows a block diagram 400 of a memory device 405 that supports selectable error control for memory device in accordance with examples as disclosed herein. The memory device 405 may be an example of aspects of a memory device as described with reference to FIGS. 2 and 3. The memory device 405 may include a value identifier component 410, a gate activation component 415, a generator component 420, an initialization component 425, a storage component 430, and an operation execution component 435. Each of these modules may communicate, directly or indirectly, with one another (e.g., via one or more buses).

The value identifier component 410 may identify, at a memory device, that a value stored at a register indicates a first error control operation for applying to data stored in a memory array of the memory device from a set of error control operations that includes the first error control operation and a second error control operation. In some examples, the value identifier component 410 may identify, at the memory device, that a second value stored at the register indicates the second error control operation.

The gate activation component 415 may activate a first set of gates configured to generate a first set of bits associated with a first matrix of the first error control operation based on identifying that the value indicates the first error control operation. In some examples, the gate activation component 415 may deactivate a second set of gates configured to generate a second set of bits associated with a second matrix of the second error control operation based on identifying the value stored at the register. In some cases, the gate activation component 415 may deactivate the first set of gates based on identifying that the second value indicates the second error control operation. In some instances, the gate activation component 415 may activate the second set of gates based on identifying that the second value indicates the second error control operation. In some examples, the gate activation component 415 may deactivate a transistor coupled with the second set of gates, where deactivating the second set of gates is based on deactivating the transistor. In some cases, the gate activation component 415 may select an output value for the second set of gates, where deactivating the second set of gates is based on selecting the output value. In some instances, the gate activation component 415 may initialize the memory device before identifying the value stored at the register, where the first set of gates and the second set of gates are deactivated based on initializing the memory device. In some examples, the gate activation component 415 may activate the second set of gates associated with the second matrix of the second error control operation based on initializing the memory device.

The generator component 420 may generate the first set of bits at the first set of gates and a third set of gates based on activating the first set of gates, where the third set of gates is associated with the first matrix and the second matrix. In some examples, the generator component 420 may generate the second set of bits at the second set of gates and the third set of gates based on activating the second set of gates. In some examples, the generator component 420 may generate a third set of bits at the first set of gates and the third set of gates associated with the first error control operation and the first matrix based on outputting the data. In some cases, the generator component 420 may generate the first set of bits and the second set of bits such that the first set of bits are parity bits associated with the first error control operation and the second set of bits are parity bits associated with the second error control operation.

The initialization component 425 may initialize the memory device before identifying the value stored at the register.

The storage component 430 may store the first set of bits generated by the first set of gates and the third set of gates in the memory array.

The operation execution component 435 may receive a read command. In some examples, the operation execution component 435 may output the data stored in the memory array based on receiving the read command. In some examples, the operation execution component 435 may compare the first set of bits with the third set of bits based on generating the third set of bits. In some examples, the operation execution component 435 may detect an error associated with outputting the data based on comparing the first set of bits with the third set of bits. In some examples, the operation execution component 435 may invert a bit in the data outputted to correct the error based on detecting the error. In some cases, the error detected by the operation execution component 435 is a single bit error, a double bit error, a triple bit error, or other quantity of bits error.

Figure 5:
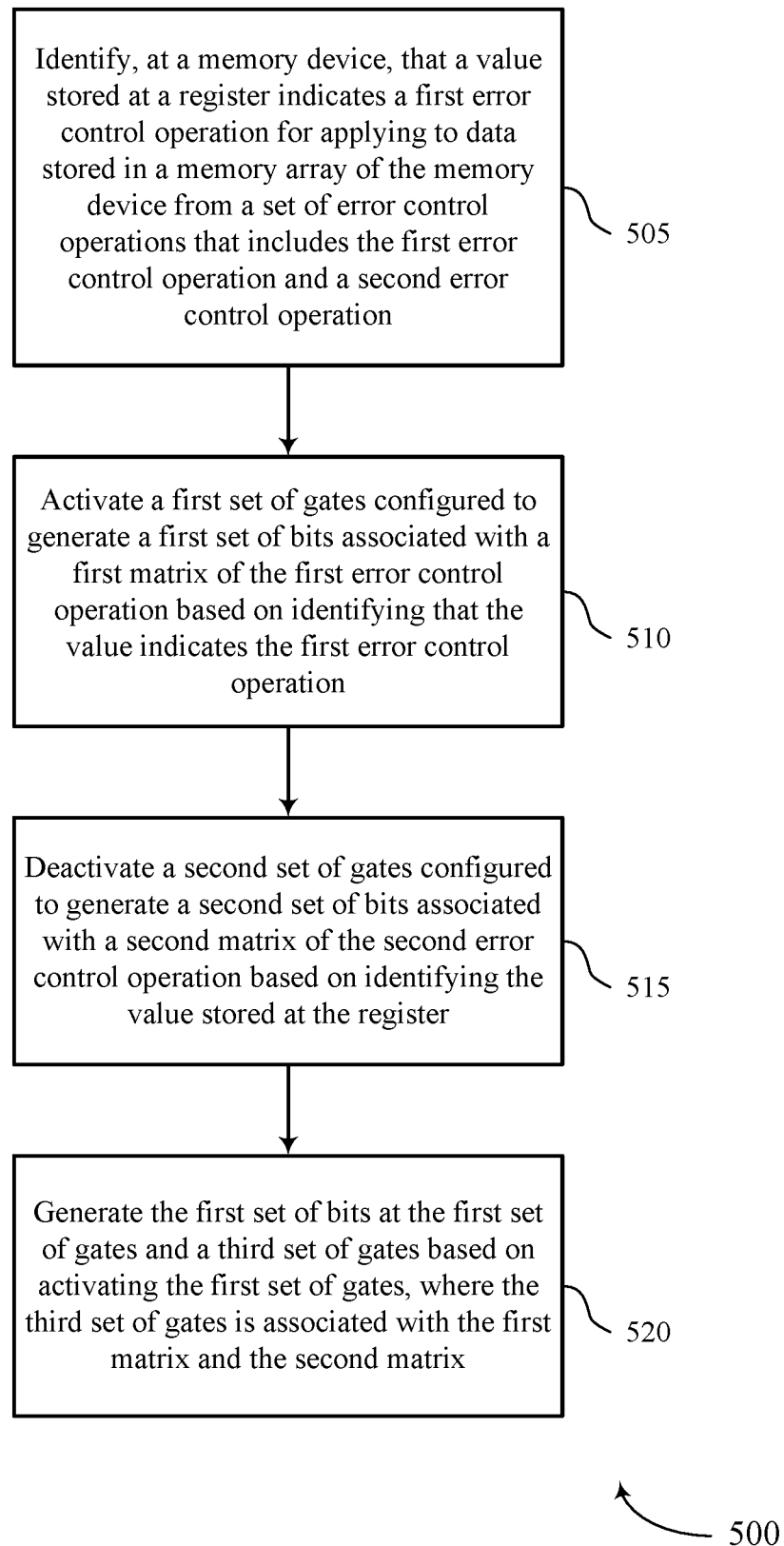
FIG. 5 shows a flowchart illustrating a method or methods that support selectable error control for memory device in accordance with examples as disclosed herein.

FIG. 5 shows a flowchart illustrating a method or methods 500 that supports selectable error control for memory device in accordance with examples as disclosed herein. The operations of method 500 may be implemented by a memory device or its components as described herein. For example, the operations of method 500 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 505, the memory device may identify, at a memory device, that a value stored at a register indicates a first error control operation for applying to data stored in a memory array of the memory device from a set of error control operations that includes the first error control operation and a second error control operation. The operations of 505 may be performed according to the methods described with reference to FIGS. 2 and 3. In some examples, aspects of the operations of 505 may be performed by a value identifier component as described with reference to FIG. 4.

At 510, the memory device may activate a first set of gates configured to generate a first set of bits associated with a first matrix of the first error control operation based on identifying that the value indicates the first error control operation. The operations of 510 may be performed according to the methods described with reference to FIGS. 2 and 3. In some examples, aspects of the operations of 510 may be performed by a gate activation component as described with reference to FIG. 4.

At 515, the memory device may deactivate a second set of gates configured to generate a second set of bits associated with a second matrix of the second error control operation based on identifying the value stored at the register. The operations of 515 may be performed according to the methods described with reference to FIGS. 2 and 3. In some examples, aspects of the operations of 515 may be performed by a gate activation component as described with reference to FIG. 4.

At 520, the memory device may generate the first set of bits at the first set of gates and a third set of gates based on activating the first set of gates, where the third set of gates is associated with the first matrix and the second matrix. The operations of 520 may be performed according to the methods described with reference to FIGS. 2 and 3. In some examples, aspects of the operations of 520 may be performed by a generator component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for identifying, at a memory device, that a value stored at a register indicates a first error control operation for applying to data stored in a memory array of the memory device from a set of error control operations that includes the first error control operation and a second error control operation, activating a first set of gates configured to generate a first set of bits associated with a first matrix of the first error control operation based on identifying that the value indicates the first error control operation, deactivating a second set of gates configured to generate a second set of bits associated with a second matrix of the second error control operation based on identifying the value stored at the register, and generating the first set of bits at the first set of gates and a third set of gates based on activating the first set of gates, where the third set of gates is associated with the first matrix and the second matrix.

Some examples of the method 500 and the apparatus described herein may further include operations, features, means, or instructions for identifying, at the memory device, that a second value stored at the register indicates the second error control operation, deactivating the first set of gates based on identifying that the second value indicates the second error control operation, activating the second set of gates based on identifying that the second value indicates the second error control operation, and generating the second set of bits at the second set of gates and the third set of gates based on activating the second set of gates.

Some cases of the method 500 and the apparatus described herein may further include operations, features, means, or instructions for deactivating a transistor coupled with the second set of gates, where deactivating the second set of gates may be based on deactivating the transistor.

Some instances of the method 500 and the apparatus described herein may further include operations, features, means, or instructions for selecting an output value for the second set of gates, where deactivating the second set of gates may be based on selecting the output value.

Some examples of the method 500 and the apparatus described herein may further include operations, features, means, or instructions for initializing the memory device before identifying the value stored at the register, where the first set of gates and the second set of gates may be deactivated based on initializing the memory device.

Some cases of the method 500 and the apparatus described herein may further include operations, features, means, or instructions for initializing the memory device before identifying the value stored at the register, and activating the second set of gates associated with the second matrix of the second error control operation based on initializing the memory device.

Some instances of the method 500 and the apparatus described herein may further include operations, features, means, or instructions for storing the first set of bits generated by the first set of gates and the third set of gates in the memory array.

Some examples of the method 500 and the apparatus described herein may further include operations, features, means, or instructions for receiving a read command, outputting the data stored in the memory array based on receiving the read command, and generating a third set of bits at the first set of gates and the third set of gates associated with the first error control operation and the first matrix based on outputting the data.

Some cases of the method 500 and the apparatus described herein may further include operations, features, means, or instructions for comparing the first set of bits with the third set of bits based on generating the third set of bits, and detecting an error associated with outputting the data based on comparing the first set of bits with the third set of bits.

Some instances of the method 500 and the apparatus described herein may further include operations, features, means, or instructions for inverting a bit in the data outputted to correct the error based on detecting the error.

In some examples of the method 500 and the apparatus described herein, the error detected may be a single bit error, a double bit error, a triple bit error, or other quantity of bits error.

In some cases of the method 500 and the apparatus described herein, the first set of bits may be parity bits associated with the first error control operation and the second set of bits may be parity bits associated with the second error control operation.

It should be noted that the methods described herein describe possible implementations, and that the operations and the steps may be rearranged or otherwise modified and that other implementations are possible. Further, portions from two or more of the methods may be combined.

An apparatus is described. The apparatus may include a memory array and a circuit configurable to perform a first error control operation and a second error control operation on data stored by the memory array, the circuit including a first set of gates configured to generate a first set of bits associated with a first matrix of the first error control operation, where the first set of gates is configured to be enabled when performing the first error control operation, a second set of gates configured to generate a second set of bits associated with a second matrix of the second error control operation, where the second set of gates is configured to be enabled when performing the second error control operation, and a third set of gates configured to generate a third set of bits that are common to both the first matrix and the second matrix, where the third set of gates is configured to be enabled when performing the first error control operation and the second error control operation.

Some examples of the apparatus may include a register coupled with the memory array and configured to store a first value associated with the first error control operation or a second value associated with the second error control operation.

In some examples, the first set of gates may be disabled when the circuit may be configured to perform the second error control operation and the second set of gates may be disabled when the circuit may be configured to perform the first error control operation.

Some examples of the apparatus may include a first transistor coupled with the first set of gates and configured to disable the first set of gates when the circuit may be configured to perform the second error control operation, and a second transistor coupled with the second set of gates and configured to disable the second set of gates when the circuit may be configured to perform the first error control operation.

In some examples, the first set of gates may be disabled in response to setting the first set of gates to a first value, and the second set of gates may be disabled in response to setting the second set of gates to a second value.

Some examples of the apparatus may include a set of pins configured to communicate information as part of operating the memory array, where the first set of gates, the second set of gates, and the third set of gates may be associated with the set of pins.

In some examples, each pin of the set of pins may be associated with a set of bits, and a first subset of gates of the first set of gates, the second set of gates, and the third set of gates may be configured to compare each bit of the set of bits with another bit of the set of bits to generate a comparison bit.

In some examples, a second subset of gates of the first set of gates, the second set of gates, and the third set of gates may be further configured to compare a first comparison bit of a first pin of the set of pins with a second comparison bit of the first pin, where the circuit may be configured to generate the first set of bits, the second set of bits, or the third set of bits based on comparing the first comparison bit with the second comparison bit.

In some examples, the first set of gates, the second set of gates, and the third set of gates include XOR logic gates.

In some examples, the first set of gates includes a first quantity of gates and the second set of gates includes a second quantity of gates, the first quantity of gates less than the second quantity of gates.

An apparatus is described. The apparatus may include a memory array, a register associated with the memory array, a circuit configurable to perform a first error control operation and a second error control operation on data stored by the memory array, a controller coupled with the memory array and the circuit and configured to cause the apparatus to, activate a first set of gates, at the circuit, configured to generate a first set of bits associated with a first matrix of the first error control operation based on identifying that the value indicates the first error control operation, deactivate a second set of gates, at the circuit, configured to generate a second set of bits associated with a second matrix of the second error control operation based on identifying the value stored at the register, and generate the first set of bits at the first set of gates and a third set of gates based on activating the first set of gates, where the third set of gates is associated with the first matrix and the second matrix.

In some cases, the controller may be further configured to identify that a second value stored at the register indicates the second error control operation, deactivate the first set of gates based on identifying that the second value indicates the second error control operation, activate the second set of gates based on identifying that the second value indicates the second error control operation, and generate the second set of bits at the second set of gates and the third set of gates based on activating the second set of gates.

In some examples, the controller may be further configured to deactivate a transistor coupled with the second set of gates, where the controller may be configured to deactivate the second set of gates based on deactivating the transistor.

In some instances, the controller may be further configured to select an output value for the second set of gates, where the controller may be configured to deactivate the second set of gates based on selecting the output value.

In some cases, the controller may be further configured to initialize the memory device before identifying the value stored at the register, where the controller may be configured to deactivate the first set of gates and the second set of gates based on initializing the memory device.

In some instances, the controller may be further configured to initialize the memory device before identifying the value stored at the register, and activate the second set of gates associated with the second matrix of the second error control operation based on initializing the memory device.

In some examples, the controller may be further configured to store the first set of bits generated by the first set of gates and the third set of gates in the memory array.

An apparatus is described. The apparatus may include a memory array of a memory device, a set of channels coupled with the memory device and a host device, and a circuit configurable to perform a first error control operation and a second error control operation on data communicated over of a channel of the set of channels, the circuit including a first set of gates configured to generate a first set of bits associated with a first matrix of the first error control operation, where the first set of gates is configured to be enabled when performing the first error control operation, a second set of gates, configured to generate a second set of bits associated with a second matrix of the second error control operation, where the second set of gates is configured to be enabled when performing the second error control operation, and a third set of gates configured to generate a third set of bits that are common to both the first matrix and the second matrix, where the third set of gates is configured to be enabled when performing the first error control operation and the second error control operation.

Some examples of the apparatus may include a second circuit coupled with the memory array and configurable to perform the first error control operation or the second error control operation on data stored by the memory array, the second circuit including.

Some examples of the apparatus may include a register coupled with the circuit and configured to store a first value associated with the first error control operation or a second value associated with the second error control operation.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a memory array; and
a circuit configurable to perform a first error control operation and a second error control operation on data stored by the memory array, the circuit comprising:
a first plurality of gates configured to generate a first set of bits associated with a first matrix of the first error control operation, wherein the first plurality of gates is configured to be enabled when performing the first error control operation;
a second plurality of gates configured to generate a second set of bits associated with a second matrix of the second error control operation, wherein the second plurality of gates is configured to be enabled when performing the second error control operation; and
a third plurality of gates configured to generate a third set of bits that are common to both the first matrix and the second matrix, wherein the third plurality of gates is configured to be enabled when performing the first error control operation and the second error control operation.

2. The apparatus of claim 1, further comprising:
a register coupled with the memory array and configured to store a first value associated with the first error control operation or a second value associated with the second error control operation.

3. The apparatus of claim 1, wherein the first plurality of gates is disabled when the circuit is configured to perform the second error control operation and the second plurality of gates is disabled when the circuit is configured to perform the first error control operation.

4. The apparatus of claim 3, further comprising:
a first transistor coupled with the first plurality of gates and configured to disable the first plurality of gates when the circuit is configured to perform the second error control operation; and
a second transistor coupled with the second plurality of gates and configured to disable the second plurality of gates when the circuit is configured to perform the first error control operation.

5. The apparatus of claim 3, wherein:
the first plurality of gates is disabled in response to setting the first plurality of gates to a first value; and
the second plurality of gates is disabled in response to setting the second plurality of gates to a second value.

6. The apparatus of claim 1, further comprising:
a plurality of pins configured to communicate information as part of operating the memory array, wherein the first plurality of gates, the second plurality of gates, and the third plurality of gates are associated with the plurality of pins.

7. The apparatus of claim 6, wherein:
each pin of the plurality of pins is associated with a set of bits; and
a first subset of gates of the first plurality of gates, the second plurality of gates, and the third plurality of gates are configured to compare each bit of the set of bits with another bit of the set of bits to generate a comparison bit.

8. The apparatus of claim 7, wherein a second subset of gates of the first plurality of gates, the second plurality of gates, and the third plurality of gates are further configured to compare a first comparison bit of a first pin of the plurality of pins with a second comparison bit of the first pin, wherein the circuit is configured to generate the first set of bits, the second set of bits, or the third set of bits based at least in part on comparing the first comparison bit with the second comparison bit.

9. The apparatus of claim 1, wherein the first plurality of gates, the second plurality of gates, and the third plurality of gates comprise XOR logic gates.

10. The apparatus of claim 1, wherein the first plurality of gates comprises a first quantity of gates and the second plurality of gates comprises a second quantity of gates, the first quantity of gates less than the second quantity of gates.

11. A method, comprising:
identifying, at a memory device, that a value stored at a register indicates a first error control operation for applying to data stored in a memory array of the memory device from a set of error control operations that includes the first error control operation and a second error control operation;
activating a first plurality of gates configured to generate a first set of bits associated with a first matrix of the first error control operation based at least in part on identifying that the value indicates the first error control operation;
deactivating a second plurality of gates configured to generate a second set of bits associated with a second matrix of the second error control operation based at least in part on identifying the value stored at the register; and
generating the first set of bits at the first plurality of gates and a third plurality of gates based at least in part on activating the first plurality of gates, wherein the third plurality of gates is associated with the first matrix and the second matrix.

12. The method of claim 11, further comprising:
identifying, at the memory device, that a second value stored at the register indicates the second error control operation;
deactivating the first plurality of gates based at least in part on identifying that the second value indicates the second error control operation;
activating the second plurality of gates based at least in part on identifying that the second value indicates the second error control operation; and
generating the second set of bits at the second plurality of gates and the third plurality of gates based at least in part on activating the second plurality of gates.

13. The method of claim 11, further comprising:
deactivating a transistor coupled with the second plurality of gates, wherein deactivating the second plurality of gates is based at least in part on deactivating the transistor.

14. The method of claim 11, further comprising:
selecting an output value for the second plurality of gates, wherein deactivating the second plurality of gates is based at least in part on selecting the output value.

15. The method of claim 11, further comprising:
initializing the memory device before identifying the value stored at the register, wherein the first plurality of gates and the second plurality of gates are deactivated based at least in part on initializing the memory device.

16. The method of claim 11, further comprising:
initializing the memory device before identifying the value stored at the register; and
activating the second plurality of gates associated with the second matrix of the second error control operation based at least in part on initializing the memory device.

17. The method of claim 11, further comprising:
storing the first set of bits generated by the first plurality of gates and the third plurality of gates in the memory array.

18. The method of claim 17, further comprising:
receiving a read command;
outputting the data stored in the memory array based at least in part on receiving the read command; and
generating a third set of bits at the first plurality of gates and the third plurality of gates associated with the first error control operation and the first matrix based at least in part on outputting the data.

19. The method of claim 18, further comprising:
comparing the first set of bits with the third set of bits based at least in part on generating the third set of bits; and
detecting an error associated with outputting the data based at least in part on comparing the first set of bits with the third set of bits.

20. The method of claim 19, further comprising:
inverting a bit in the data outputted to correct the error based at least in part on detecting the error.

21. The method of claim 19, wherein the error detected is a single bit error, a double bit error, a triple bit error, or other quantity of bits error.

22. The method of claim 11, wherein the first set of bits are parity bits associated with the first error control operation and the second set of bits are parity bits associated with the second error control operation.

23. An apparatus, comprising:
a memory array,
a register associated with the memory array,
a circuit configurable to perform a first error control operation and a second error control operation on data stored by the memory array, and
a controller coupled with the memory array and the circuit and configured to cause the apparatus to:
identify that a value stored in the register indicates the first error control operation for applying to the data stored in the memory array of a memory device;
activate a first plurality of gates, at the circuit, configured to generate a first set of bits associated with a first matrix of the first error control operation based at least in part on identifying that the value indicates the first error control operation;
deactivate a second plurality of gates, at the circuit, configured to generate a second set of bits associated with a second matrix of the second error control operation based at least in part on identifying the value stored at the register; and
generate the first set of bits at the first plurality of gates and a third plurality of gates based at least in part on activating the first plurality of gates, wherein the third plurality of gates is associated with the first matrix and the second matrix.

24. The apparatus of claim 23, wherein the controller is further configured to:
identify that a second value stored at the register indicates the second error control operation;
deactivate the first plurality of gates based at least in part on identifying that the second value indicates the second error control operation;
activate the second plurality of gates based at least in part on identifying that the second value indicates the second error control operation; and
generate the second set of bits at the second plurality of gates and the third plurality of gates based at least in part on activating the second plurality of gates.

25. The apparatus of claim 23, wherein the controller is further configured to:
deactivate a transistor coupled with the second plurality of gates, wherein the controller is configured to deactivate the second plurality of gates based at least in part on deactivating the transistor.

26. The apparatus of claim 23, wherein the controller is further configured to:
select an output value for the second plurality of gates, wherein the controller is configured to deactivate the second plurality of gates based at least in part on selecting the output value.

27. The apparatus of claim 23, wherein the controller is further configured to:
initialize the memory device before identifying the value stored at the register, wherein the controller is configured to deactivate the first plurality of gates and the second plurality of gates based at least in part on initializing the memory device.

28. The apparatus of claim 23, wherein the controller is further configured to:
initialize the memory device before identifying the value stored at the register; and
activate the second plurality of gates associated with the second matrix of the second error control operation based at least in part on initializing the memory device.

29. The apparatus of claim 23, wherein the controller is further configured to:
store the first set of bits generated by the first plurality of gates and the third plurality of gates in the memory array.

30. A non-transitory computer-readable medium storing code comprising instructions, which when executed by a processor of an electronic device, cause the electronic device to:
identify that a value stored at a register indicates a first error control operation for applying to data stored in a memory array of a memory device from a set of error control operations that includes the first error control operation and a second error control operation;
activate a first plurality of gates configured to generate a first set of bits associated with a first matrix of the first error control operation based at least in part on identifying that the value indicates the first error control operation;
deactivate a second plurality of gates configured to generate a second set of bits associated with a second matrix of the second error control operation based at least in part on identifying the value stored at the register; and
generate the first set of bits at the first plurality of gates and a third plurality of gates based at least in part on activating the first plurality of gates, wherein the third plurality of gates is associated with the first matrix and the second matrix.

31. The non-transitory computer-readable medium of claim 30, wherein the instructions, when executed by the processor the electronic device, further cause the electronic device to:
- identify, at the memory device, that a second value stored at the register indicates the second error control operation;
- deactivate the first plurality of gates based at least in part on identifying that the second value indicates the second error control operation;
- activate the second plurality of gates based at least in part on identifying that the second value indicates the second error control operation; and
- generate the second set of bits at the second plurality of gates and the third plurality of gates based at least in part on activating the second plurality of gates.

32. The non-transitory computer-readable medium of claim 30, wherein the instructions, when executed by the processor the electronic device, further cause the electronic device to:
- deactivate a transistor coupled with the second plurality of gates, wherein the electronic device is configured to deactivate the second plurality of gates based at least in part on deactivating the transistor.

33. An apparatus, comprising:
- a memory array of a memory device;
- a plurality of channels coupled with the memory device and a host device; and
- a circuit configurable to perform a first error control operation and a second error control operation on data communicated over of a channel of the plurality of channels, the circuit comprising:
  - a first plurality of gates configured to generate a first set of bits associated with a first matrix of the first error control operation, wherein the first plurality of gates is configured to be enabled when performing the first error control operation;
  - a second plurality of gates, configured to generate a second set of bits associated with a second matrix of the second error control operation, wherein the second plurality of gates is configured to be enabled when performing the second error control operation; and
  - a third plurality of gates configured to generate a third set of bits that are common to both the first matrix and the second matrix, wherein the third plurality of gates is configured to be enabled when performing the first error control operation and the second error control operation.

34. The apparatus of claim 33, further comprising:
- a second circuit coupled with the memory array and configurable to perform the first error control operation or the second error control operation on data stored by the memory array, the second circuit comprising:
  - a fourth plurality of gates configured to generate a fourth set of bits associated with the first matrix of the first error control operation, wherein the fourth plurality of gates is configured to be enabled when performing the first error control operation;
  - a fifth plurality of gates, configured to generate a fifth set of bits associated with the second matrix of the second error control operation, wherein the fifth plurality of gates is configured to be enabled when performing the second error control operation; and
  - a sixth plurality of gates configured to generate a sixth set of bits that are common to both the first matrix and the second matrix, wherein the sixth plurality of gates is configured to be enabled when performing the first error control operation and the second error control operation.

35. The apparatus of claim 33, further comprising:
- a register coupled with the circuit and configured to store a first value associated with the first error control operation or a second value associated with the second error control operation.

* * * * *